(12) United States Patent
Yamaguchi

(10) Patent No.: US 9,704,246 B2
(45) Date of Patent: Jul. 11, 2017

(54) IMAGE PROCESSING APPARATUS, IMAGE PROCESSING METHOD, AND STORAGE MEDIUM

(71) Applicant: FUJITSU LIMITED, Kawasaki-shi, Kanagawa (JP)

(72) Inventor: Nobuyasu Yamaguchi, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 15/057,478

(22) Filed: Mar. 1, 2016

(65) Prior Publication Data

US 2016/0180536 A1    Jun. 23, 2016

Related U.S. Application Data

(63) Continuation of application No. PCT/JP2013/005597, filed on Sep. 20, 2013.

(51) Int. Cl.
  *G09G 5/00*  (2006.01)
  *G06T 7/00*  (2017.01)
  (Continued)

(52) U.S. Cl.
  CPC .............. *G06T 7/0044* (2013.01); *G06K 9/32* (2013.01); *G06T 7/12* (2017.01); *G06T 7/74* (2017.01);
  (Continued)

(58) Field of Classification Search
  CPC ............. G06T 2210/00; G06T 2210/21; G06T 7/0044; G06T 2207/20164;
  (Continued)

(56) References Cited

U.S. PATENT DOCUMENTS 4,119,900 A * 10/1978 Kremnitz ............. G05B 13/047
                                                              318/580
2006/0004280 A1    1/2006 Kotake et al.
(Continued)

FOREIGN PATENT DOCUMENTS

JP   2001-195597   7/2001
JP   2002-032784   1/2002
(Continued)

OTHER PUBLICATIONS

Huang, Qiang, et al. "Data matrix code location based on finder pattern detection and bar code border fitting." Mathematical Problems in Engineering 2012 (2012) (pp. 1-14).*
(Continued)

*Primary Examiner* — Xiao Wu
*Assistant Examiner* — Sarah Lhymn
(74) *Attorney, Agent, or Firm* — Fujitsu Patent Center

(57) ABSTRACT

An image processing apparatus, includes a processor configured to obtain a marker image including a first pixel area including a first image indicating a shape of an outer frame and a second pixel area and a second image arranged within the outer frame, extract an intersecting point of a first line segment in parallel with a boundary between the first pixel area and the second pixel area which are adjacent to each other along a predetermined direction and a second line segment in parallel with a boundary between the first pixel area and the second pixel area which are adjacent to each other along a direction perpendicular to the predetermined direction, a first apex indicating an apex of four corners of the outer frame, and a second apex included in the second image, and identify a display position using the intersecting point, the first apex, or the second apex.

20 Claims, 14 Drawing Sheets

(51) Int. Cl.
  *G06K 9/32* (2006.01)
  *G06T 19/00* (2011.01)
  *G06T 7/73* (2017.01)
  *G06T 7/12* (2017.01)
  *G06K 9/00* (2006.01)

(52) U.S. Cl.
  CPC ........ *G06T 19/006* (2013.01); *G06K 9/00671* (2013.01); *G06K 2009/3225* (2013.01); *G06T 2207/10024* (2013.01); *G06T 2207/20164* (2013.01); *G06T 2207/30204* (2013.01)

(58) Field of Classification Search
  CPC . G06T 2207/20192; G06T 2207/20201; G06T 2207/30204; G06T 19/006; G06K 9/32; G06K 9/3216; G06K 9/00671; G06K 9/34
  USPC ................ 345/619, 632, 633, 634, 637, 639
  See application file for complete search history.

(56) References Cited

U.S. PATENT DOCUMENTS

| | | | | |
|---|---|---|---|---|
| 2007/0077987 | A1* | 4/2007 | Gururajan | G07F 17/32 463/22 |
| 2007/0098234 | A1 | 5/2007 | Fiala | |
| 2009/0274370 | A1* | 11/2009 | Sakamoto | G06K 9/00624 382/190 |
| 2010/0168562 | A1* | 7/2010 | Zhao | A61B 34/30 600/426 |
| 2011/0243379 | A1* | 10/2011 | Miyajima | G01C 21/28 382/103 |
| 2012/0121127 | A1* | 5/2012 | Aoki | G06T 7/0044 382/103 |
| 2012/0219177 | A1* | 8/2012 | Osako | G06T 7/0046 382/103 |

FOREIGN PATENT DOCUMENTS

| | | |
|---|---|---|
| JP | 2005-326274 | 11/2005 |
| JP | 2010-160056 | 7/2010 |
| JP | 2001-287174 | 12/2010 |

OTHER PUBLICATIONS

Hirotake Ishii et al., "Proposal and Evaluation of Decommissioning Support Method of Nuclear Power Plants using Augmented Reality", Collected Papers of The Virtual Reality Society of Japan, vol. 13, No. 2, 2008, pp. 289-300, Partial English Translation (48 pages).
International Search Report and Written Opinion of the International Searching Authority (Form PCT/ISA/210, Form PCT/ISA/237), mailed in connection with PCT/JP2013/005597 and mailed Nov. 26, 2013 (9 pages).
Re, Guido Maria et al.,"Low-Cost Augmented Reality for Industrial Problems," Politecnico Di Milano Mechanical Department Doctoral Programme in Mechanical Engineering Doctoral Dissertation of: The Chair of the Doctoral Program, Mar. 23, 2013, XP055339115, 166 pages, Retrieved from the Internet: URL:https://www.politesi.polimi.it/bitstream/10589/74781/1/2013_03_PhD_Re.pdf [retrieved on Jan. 26, 2017].
Ishii, Hirotake et al.,"Proposal and Evaluation of a Supporting Method for NPP Decommissioning Work by Augmented Reality", Jan. 1, 2008, XP055339108, 6 pages, Retrieved from the Internet: URL:http://hydro.energy.kyoto-u.ac.jp/Publication/files/1085/PAPER_PDF/S408CE.pdf [retrieved on Jan. 26, 2017].
Kato, Hirokazu et al.,"Marker Tracking and HMD Calibration for a Video-based Augmented Reality Conferencing System", Augmented Reality, (IWAR '99) Proceedings of the 2ND IEEE and ACM International Workshop on San Francisco, CA, USA, IEEE COMPUT. SOC, US, Oct. 20, 1999, pp. 85-94, XP010358756.
Fiala, Mark, "ARTag, An Improved Marker System Based on ARToolkit*", pp. 1-36, NRC 47166, Jan. 1, 2004, XP055339117, National Research Council Canada, Institute for Information Technology, Retrieved from the Internet: URL:http://www.cs.cmu.edu/afs/cs/project/skinnerbots/Wiki/AprilTags/NRC-47166.pdf [retrieved on Jan. 25, 2017].
Extended European Search Report dated Feb. 6, 2017 for corresponding European Patent Application No. 13893691.9, 8 pages.

* cited by examiner

⬚ : FOUR-CORNERED SHAPE

⊙ : FIRST APEX

⊙ : INTERSECTING POINT
(CENTER POINT)

⊙ : SECOND APEX

⊙ : SECOND APEX

----- : CONTOUR POINT

⊙ : INTERSECTING POINT (CENTER POINT)

----- : CONTOUR POINT

FIG. 8

| No. | STRAIGHT LINE 1 | STRAIGHT LINE 2 | STRAIGHT LINE 3 | STRAIGHT LINE 4 | SHORTEST LENGTH OF STRAIGHT LINE | NUMBER OF STRAIGHT LINES HAVING SHORTEST LENGTH | SUM OF STRAIGHT LINES | PRIORITY ORDER |
|---|---|---|---|---|---|---|---|---|
| 1 | 1 | 1 | 1 | 1 | 1 | 4 | 4 | 5 |
| 2 | 1 | 1 | 1 | TWO OR MORE | 1 | 3 | 5 | 4 |
| 3 | 1 | 1 | TWO OR MORE | 1 | 1 | 3 | 5 | 4 |
| 4 | 1 | 1 | TWO OR MORE | TWO OR MORE | 1 | 2 | 6 | 3 |
| 5 | 1 | TWO OR MORE | 1 | 1 | 1 | 3 | 5 | 4 |
| 6 | 1 | TWO OR MORE | 1 | TWO OR MORE | 1 | 2 | 6 | 3 |
| 7 | 1 | TWO OR MORE | TWO OR MORE | 1 | 1 | 2 | 6 | 3 |
| 8 | 1 | TWO OR MORE | TWO OR MORE | TWO OR MORE | 1 | 1 | 7 | 2 |
| 9 | TWO OR MORE | 1 | 1 | 1 | 1 | 3 | 5 | 4 |
| 10 | TWO OR MORE | 1 | 1 | TWO OR MORE | 1 | 2 | 6 | 3 |
| 11 | TWO OR MORE | 1 | TWO OR MORE | 1 | 1 | 2 | 6 | 3 |
| 12 | TWO OR MORE | 1 | TWO OR MORE | TWO OR MORE | 1 | 1 | 7 | 2 |
| 13 | TWO OR MORE | TWO OR MORE | 1 | 1 | 1 | 2 | 6 | 3 |
| 14 | TWO OR MORE | TWO OR MORE | 1 | TWO OR MORE | 1 | 1 | 7 | 2 |
| 15 | TWO OR MORE | TWO OR MORE | TWO OR MORE | 1 | 1 | 1 | 7 | 2 |
| 16 | TWO OR MORE | TWO OR MORE | TWO OR MORE | TWO OR MORE | 2 | 0 | 8 | 1 |

| No. | STRAIGHT LINE 1 | STRAIGHT LINE 2 | SHORTEST LENGTH OF STRAIGHT LINE | SUM OF STRAIGHT LINES | PRIORITY ORDER |
|---|---|---|---|---|---|
| 1 | 1 | 1 | 1 | 2 | 20 |
| 2 | | 2 | 1 | 3 | 19 |
| 3 | | 3 | 1 | 4 | 18 |
| 4 | | 4 | 1 | 5 | 17 |
| 5 | | 5 | 1 | 6 | 16 |
| 6 | | 6 | 1 | 7 | 15 |
| 7 | 2 | 1 | 1 | 3 | 19 |
| 8 | | 2 | 2 | 4 | 14 |
| 9 | | 3 | 2 | 5 | 13 |
| 10 | | 4 | 2 | 6 | 12 |
| 11 | | 5 | 2 | 7 | 11 |
| 12 | | 6 | 2 | 8 | 10 |
| 13 | 3 | 1 | 1 | 4 | 18 |
| 14 | | 2 | 2 | 5 | 13 |
| 15 | | 3 | 3 | 6 | 9 |
| 16 | | 4 | 3 | 7 | 8 |
| 17 | | 5 | 3 | 8 | 7 |
| 18 | | 6 | 3 | 9 | 6 |
| 19 | 4 | 1 | 1 | 5 | 17 |
| 20 | | 2 | 2 | 6 | 12 |
| 21 | | 3 | 3 | 7 | 8 |
| 22 | | 4 | 4 | 8 | 5 |
| 23 | | 5 | 4 | 9 | 4 |
| 24 | | 6 | 4 | 10 | 3 |
| 25 | 5 | 1 | 1 | 6 | 16 |
| 26 | | 2 | 2 | 7 | 11 |
| 27 | | 3 | 3 | 8 | 7 |
| 28 | | 4 | 4 | 9 | 4 |
| 29 | | 5 | 5 | 10 | 3 |
| 30 | | 6 | 5 | 11 | 2 |
| 31 | 6 | 1 | 1 | 7 | 15 |
| 32 | | 2 | 2 | 8 | 10 |
| 33 | | 3 | 3 | 9 | 6 |
| 34 | | 4 | 4 | 10 | 3 |
| 35 | | 5 | 5 | 11 | 2 |
| 36 | | 6 | 6 | 12 | 1 |

| No. | SHAPE FEATURE | PRIORITY ORDER IN RESPECTIVE SHAPE FEATURES | WEIGHTING COEFFICIENT UPON CALCULATION TRANSLATION VECTOR AND ROTATION VECTOR |
|---|---|---|---|
| 1 | CHECKERED SHAPE | 1 ~ 2 | 1.00 |
| 2 | | 3 ~ 5 | 0.50 |
| 3 | POLYGONAL SHAPE | 1 ~ 5 | 0.25 |
| 4 | | 6 ~ 10 | 0.20 |
| 3 | | 11 ~ 15 | 0.17 |
| 4 | | 16 ~ 20 | 0.14 |
| 4 | FOUR-CORNERED SHAPE | 1 | 0.33 |

FIG. 13A
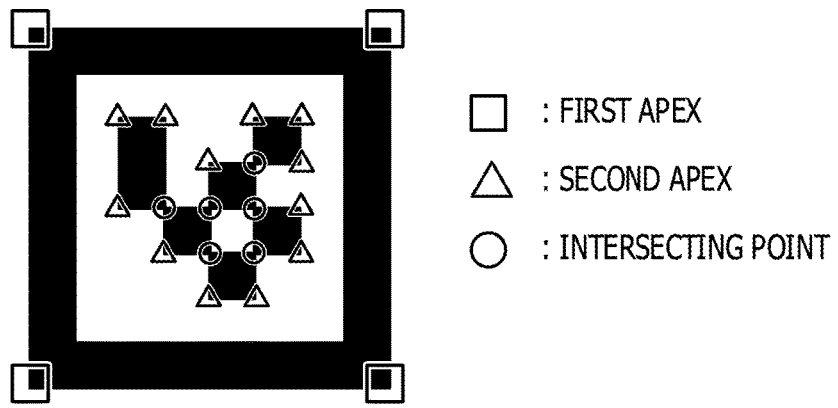
FIG. 13B
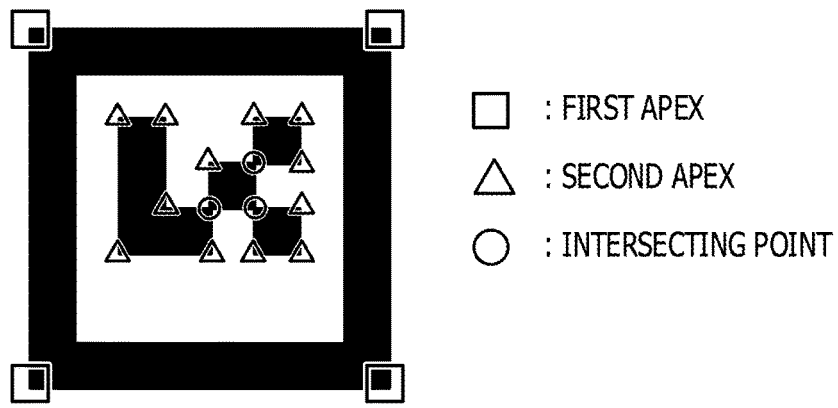
FIG. 13C
| TARGET MARKER | TYPE OF SHAPE FEATURE | APEX OR ENDING POINT | CALCULATION COEFFICIENT OF RELIABILITY | RELIABILITY |
|---|---|---|---|---|
| FIRST MARKER | CHECKERED SHAPE | 6 | 2 | 24.0 |
|  | POLYGONAL SHAPE | 16 | 0.5 |  |
|  | FOUR-CORNERED SHAPE | 4 | 1 |  |
| SECOND MARKER | CHECKERED SHAPE | 3 | 2 | 18.0 |
|  | POLYGONAL SHAPE | 16 | 0.5 |  |
|  | FOUR-CORNERED SHAPE | 4 | 1 |  |

IMAGE PROCESSING APPARATUS, IMAGE PROCESSING METHOD, AND STORAGE MEDIUM

CROSS-REFERENCE TO RELATED APPLICATION

This application is a continuation application of International Application PCT/JP2013/005597 filed on Sep. 20, 2013 and designated the U.S., the entire contents of which are incorporated herein by reference.

FIELD

The embodiments discussed herein are related, for example, to an image processing apparatus that displays display information at an arbitrary position on an image, an image processing method, and a storage medium.

BACKGROUND

In recent years, along with development of an information communication technology, an image processing technology based on an augmented reality (AR) for adding visual display information to an image obtained by shooting an actual space (external world) by using a computer to display the image has been developed. An interface in the technology related to the augmented reality is provided with the following function. That is, shooting of a marker (which may also be referred to as a two-dimensional code) provided to an object in front of user's eyes is performed by using a camera fixed at an arbitrary position or a freely movable camera to obtain an image including the marker. Thereafter, display information corresponding to additional information related to the object and also being associated with the marker is displayed on a display.

An image processing method based on the augmented reality is characterized, specifically, in that the display information corresponding to the marker is superposed and displayed on a display of a camera (which may also be referred to as a preview screen), a display of a PC to which a camera is mounted, or a display of a mobile terminal based on a reference position determined from four corners of the shot marker and a physical coordinate system based on the reference position. According to the image processing method, it is possible to associate the display information with a display position of the object.

Functions of identifying a failure location when a failure occurs in an electronic device or the like and supporting field work such as a user failure recovery operation are realized by using the augmented reality technology. For example, a marker having a particular shape feature is provided to an object set as a work target or an area in the vicinity of this object, and the display information is superposed in real time on the image shot by the camera to be displayed based on various pieces of information included in the marker. For example, in supporting of a recovery operation for a paper jam failure in a copier, a technology has been proposed for performing superposed display of an internal video of the copier associated with a paper jam occurrence position and an operation procedure on the copier corresponding to the work target.

Herein, it is supposed that the following various problems may exist in the field operation based on the related-art method in which the image processing technology of the augmented reality in the related art is not used.

(1-1) An operator takes in to a work site a large number of written operation procedures made of paper in which work target positions and procedures are described. The operator selects, by itself, a part to be used and referred to and also executes the operation while visually comparing the descriptions of the written operation procedures with a site situation. For this reason, it takes time to select the part to be used, and an operational error occurs in a manner that an erroneous part is selected or an erroneous visual recognition occurs upon the visual comparison, for example.

(1-2) A work results recorded by filling in a check sheet made of paper. Since work load for digitalizing recording contents is large, the work result is saved as it is in the form of the check sheet made of paper. Thus, it is difficult to perform organization and analysis of the work result.

With regard to the above-described problems, the following improvement effects are expected by applying the image processing technology using the augmented reality to the above-described work site.

(2-1) Only by shooting a work target object by using the camera of the image processing apparatus that stores digitalized manuals, operation parts and procedures related to the work target object are displayed and presented in real time by way of superposed display of display information (which may also be referred to as an object icon) on an image of the display (which may also be referred to as a camera preview image). Accordingly, it is possible to shorten working hours of the user and reduce operational errors.

(2-2) A recording operation of the work result is executed by pressing the display information displayed while being associated with the work target object to be selected by a finger, for example, to switch the screen to an input screen for the work result. When the recording of the work result is completed, since the work result has been already digitalized, it is facilitated to perform the organization and editing of data of the work result. In this manner, according to the image processing technology using the augmented reality, various improvements in working efficiencies in the work site are expected.

For example, "Proposal and Evaluation of Decommissioning Support Method of Nuclear Power Plants using Augmented Reality", *Collected Papers of The Virtual Reality Society of Japan*, Vol. 13, No. 2, pp. 289-300, 2008 or the like is disclosed as a related art.

With regard to a display operation of the display information in the image processing technology using the augmented reality based on a current marker recognition, for example, when recognition of a marker included in the image is successful, a recognition position and an orientation of the marker included in the image are used as a reference, and the display information is displayed based on a relative position with respect to the reference position of the marker. As described above, the reference position of the marker is determined, for example, from four corners of the marker. Since the display position of the display information is specified in accordance with the reference position of the marker, it is important to improve a detection accuracy of the reference position of the marker in order to secure visibility to the user of the display information. From the above descriptions, the visibility to the user of the display information may be preferably further improved.

SUMMARY

According to an aspect of the invention, an image processing apparatus includes a memory; and a processor coupled to the memory and configured to obtain an image of a marker that includes a first pixel area and a second pixel area having mutually different color tones and is used to identify display information and a reference position for displaying the display information, the first pixel area including a first image indicating a shape of an outer frame of the first pixel area and a second image arranged within the outer frame, extract, from the image of the marker, an intersecting point of a first line segment in parallel with a boundary between the first pixel area and the second pixel area which are adjacent to each other along a predetermined direction and a second line segment in parallel with a boundary between the first pixel area and the second pixel area which are adjacent to each other along a direction perpendicular to the predetermined direction, a first apex indicating an apex of four corners of the outer frame, and a second apex included in the second image, and identify a position for displaying the display information while the intersecting point, the first apex, or the second apex is set as the reference position.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 8 illustrates an example table including the priority order while using a length of a straight line as a reference in the checkered shape;

FIG. 9 illustrates an example table including priority orders while using a length of a straight line as a reference in the polygonal shape;

FIG. 10 illustrates an example table including the shape feature, the priority order, and a weighting coefficient;

FIG. 13A illustrates an example of a first marker in which first apexes, second apexes, and intersections are indicated;

FIG. 13B illustrates an example of a second marker in which first apexes, second apexes, and intersections are indicated;

FIG. 13C illustrates an example table including a reliability; and

DESCRIPTION OF EMBODIMENTS

First, problems of the technology in the related art will be described. The problems are newly found as a result of detailed review conducted on the technology in the related art by the present inventor and others, and the problems are not recognized in the related art. The following aspects have been found in the image processing based on the augmented reality in which a display position of the above-described display information fluctuates in real time through keen examination conducted by the present inventor and others. Position and orientation information used for displaying the display information may be calculated, for example, while coordinates of positions corresponding to corners of a four-cornered shape of a marker (which may also be referred to as apexes) are used as reference coordinates. Specifically, the position and orientation information may be calculated based on a translation vector (Tx, Ty, Tz) representing coordinates of a center position of the marker in a three-dimensional coordinate system (x, y, z) while a shooting direction of a camera that shoots the marker is set as a reference and a rotation vector (Rx, Ry, Rz) representing a rotation angle of the marker with respect to each axis of the translation vector. In a case where the center position of the marker is set as an origin, for example, the rotation angle of the marker represents how much the origin is rotated with respect to the axes of the translation vectors Tx, Ty, and Tz.

Figure 1:
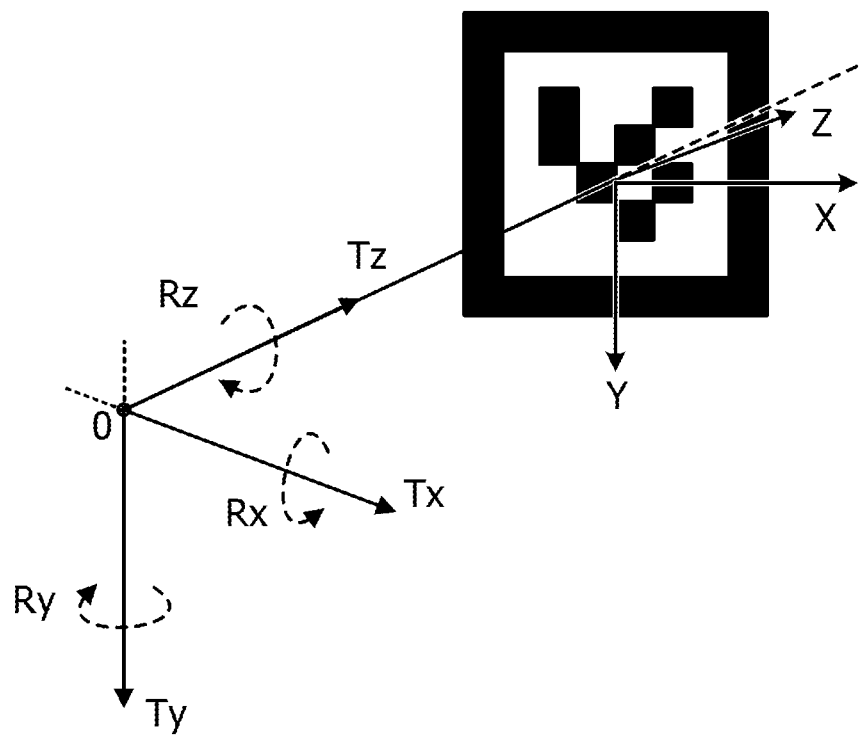
FIG. 1 is a definition diagram of a rotation vector and a translation vector.

FIG. 1 is a definition diagram of a rotation vector and a translation vector. As illustrated in FIG. 1, the translation vector Tz is specified perpendicularly with respect to the marker from an origin 0 at an arbitrary position. Then, the translation vectors Tx and Ty corresponding to the translation vector Tz are respectively specified. The rotation vectors Rx, Ry, and Rz are respectively specified with respect to rotation directions of the translation vectors Tx, Ty, and Tz. In other words, a point PCn=(xn, yn, zn), which is obtained when a point PMn=(Xn, Yn, Zn) on a three-dimensional coordinate system (X, Y, Z) while the shape of the marker is set as a reference (where the center of the marker is set as the origin, directions of respective sides are set as an X axis and a Y axis, and a normal direction of the marker is set as a Z axis) is seen from the three-dimensional coordinate system in which the shooting direction of the camera is set as the reference, may be represented by using the following expression.

$$PCn = R(\theta_x, \theta_y, \theta_z) \cdot PMn + T \quad (1)$$

where $T = (Tx, Ty, Tz)$, $R(\theta_x, \theta_y, \theta_z) = Rx(\theta_x) \cdot Ry(\theta_y) \cdot Rz(\theta_z)$, and $$Rx(\theta x) = \begin{pmatrix} 1 & 0 & 0 \\ 0 & \cos\theta x & \sin\theta x \\ 0 & -\sin\theta x & \cos\theta x \end{pmatrix},$$

-continued $$Ry(\theta y) = \begin{pmatrix} \cos\theta y & 0 & -\sin\theta y \\ 0 & 1 & 0 \\ \sin\theta y & 0 & \cos\theta x \end{pmatrix}, Rz(\theta z) = \begin{pmatrix} \cos\theta z & \sin\theta z & 0 \\ -\sin\theta z & \cos\theta x & 0 \\ 0 & 0 & 1 \end{pmatrix}$$

The rotation vector (Rx, Ry, Rz) may be calculated from the above-described rotation matrix R ($\theta_x$, $\theta_y$, $\theta_z$). Herein, R ($\theta_x$, $\theta_y$, $\theta_z$) may be calculated by using a simultaneous equation in the above-described Expression 1. For example, in a case where the four corners of the marker are used, while it is supposed that each point of the four corners is on the same plane (Zn=0), the simultaneous equation may be solved if coordinates of points are found for the four points in a single image. At this time, PMn=(Xn, Yn, Zn) and PCn=(xn, yn, zn) are uniquely determined by a coefficient based on the reference position of the marker. In this manner, the translation vector and the rotation vector are calculated based on the reference position of the marker.

The above-described calculation accuracy of the translation vector and the rotation vector depends on a detection accuracy of the coordinates (positions) of the apexes of the four-cornered shape of the marker. It is found through keen examination conducted by the present inventor and others that it is not easy to improve the coordinates of the apexes of the four-cornered shape of the marker since the detection error with regard to the positions of the apexes of the four-cornered shape of the marker is increased by an influence from indistinctness of the shot image caused by a quantization error or imaging blur of the camera.

Figure 2A:
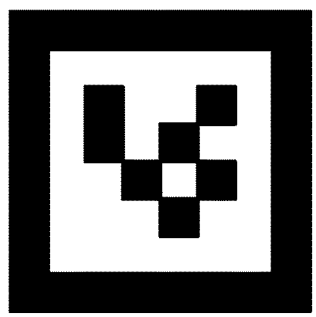
FIG. 2A illustrates an example marker.
Figure 2B:
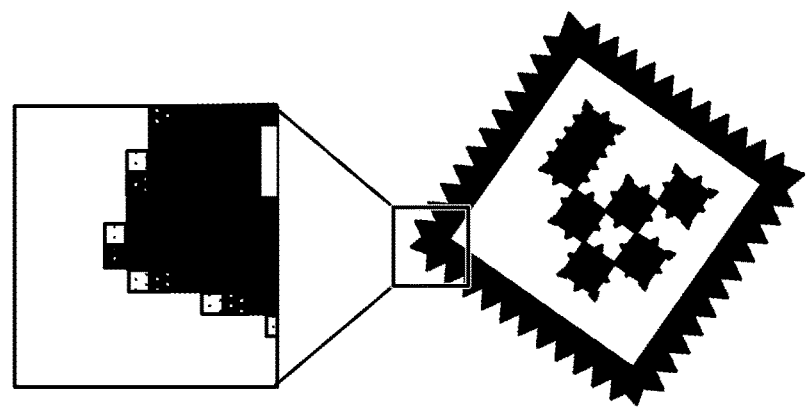
FIG. 2B is a conceptual diagram of the marker in which a four-cornered shape becomes indistinct because of a quantization error.
Figure 2C:
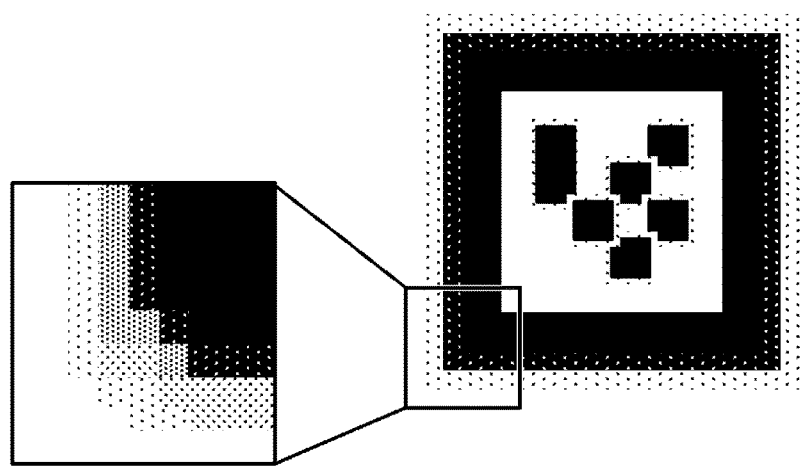
FIG. 2C is a conceptual diagram of the marker in which the four-cornered shape becomes indistinct because of imaging blur.

FIG. 2A illustrates an example marker. FIG. 2B is a conceptual diagram of the marker in which the four-cornered shape becomes indistinct because of the quantization error. FIG. 2C is a conceptual diagram of the marker in which the four-cornered shape becomes indistinct because of the imaging blur. The marker illustrated in FIG. 2A has, for example, a square shape constituted by eight-by-eight modules, and areas corresponding to one module on an outer circumference is fixed as black areas. A marker ID uniquely associated with the marker is represented by a pattern constituted by white areas and black areas in the six-by-six modules in an inner part of the marker, for example. According to embodiments that will be described below, for example, markers having various shapes are applicable in addition to the marker illustrated in FIG. 2A. In FIG. 2B and FIG. 2C too, a boundary between pixels of the white areas and the black areas constituting the marker becomes indistinct because of the quantization error or the imaging blur, and a problem occurs that the positions of the apexes of the four-cornered shape of the marker illustrated in FIG. 2A are not matched with detected positions. For example, in a case where the boundary is specified between the white areas and the black areas, for example, while a pixel value of a predetermined threshold (for example, the pixel value=125) is used, the boundary is specified based on the pixels having the pixel value lower than or equal to the threshold. In a case where the quantization error or the imaging blur does not occur, the boundary is specified at an original position of the boundary of the marker. However, when the quantization error or the imaging blur occurs, for example, the black areas apparently expand, and the boundary of the marker is specified on an outer side. In this case, since the calculation accuracy of the translation vector and the rotation vector is decreased, a problem occurs that the display position of the display information becomes unstable. In particular, the decrease in the calculation accuracy of the rotation vector becomes prominent in many cases. A phenomenon in which the display information sways from side to side and up and down while a position in the vicinity of the center of the marker is set as a base point or a phenomenon in which the display information is displayed in an uneven manner occurs. Accordingly, a problem occurs that visibility of the display information is degraded. In other words, to provide an image processing apparatus that improves the visibility to the user of the display information, the influence from the quantization error or the imaging blur is preferably reduced.

The present inventor and others examine the following method as a comparison example in view of the above-described problem of the degradation in the visibility of the display information. For example, to reduce the detection error of the apex coordinates of the four-cornered shape with respect to the quantization error or the imaging blur, a method is conceivable in which interpolation between the pixels in the vicinity of the four-cornered shape is performed, and then marker detection processing is performed to obtain the apex coordinates of the four-cornered shape at an accuracy lower than or equal to an interval of pixels constituting the marker (sub-pixel accuracy). However, even when the method is employed, the reduction amount of the error caused by the quantization error or the imaging blur is limited, and effects are not sufficient. As another comparison example, a method of reducing the sway or unevenness is conceivable in which the translation vector or the rotation vector is temporarily saved along a timeline, and then prediction filter processing such as smoothing filter or particle filter is used. However, the prediction filter processing is merely prediction processing, and a problem occurs from the viewpoint of accuracy with respect to the original correct value. Furthermore, in a case where a movement speed of the marker on a shooting screen is suddenly changed, since the prediction filter processing does not follow the movement speed, a problem also occurs that an even larger error is caused. As still another comparison example, a method of increasing a resolution of an imaging lens that images the marker and a resolution of an imaging element is conceivable. It is to be noted that it is not realistic from the viewpoint of calculation load to perform image processing on an image having a high resolution in the image processing based on the augmented reality that shifts in real time.

While the above-described aspects newly found by the keen examination conducted by the present inventor and others are taken into account, an image processing apparatus, an image processing method, and an image processing program according to an embodiment will be hereinafter described in detail with reference to the drawings. This embodiment is not intended to limit the disclosed technology.

First Embodiment

Figure 3:
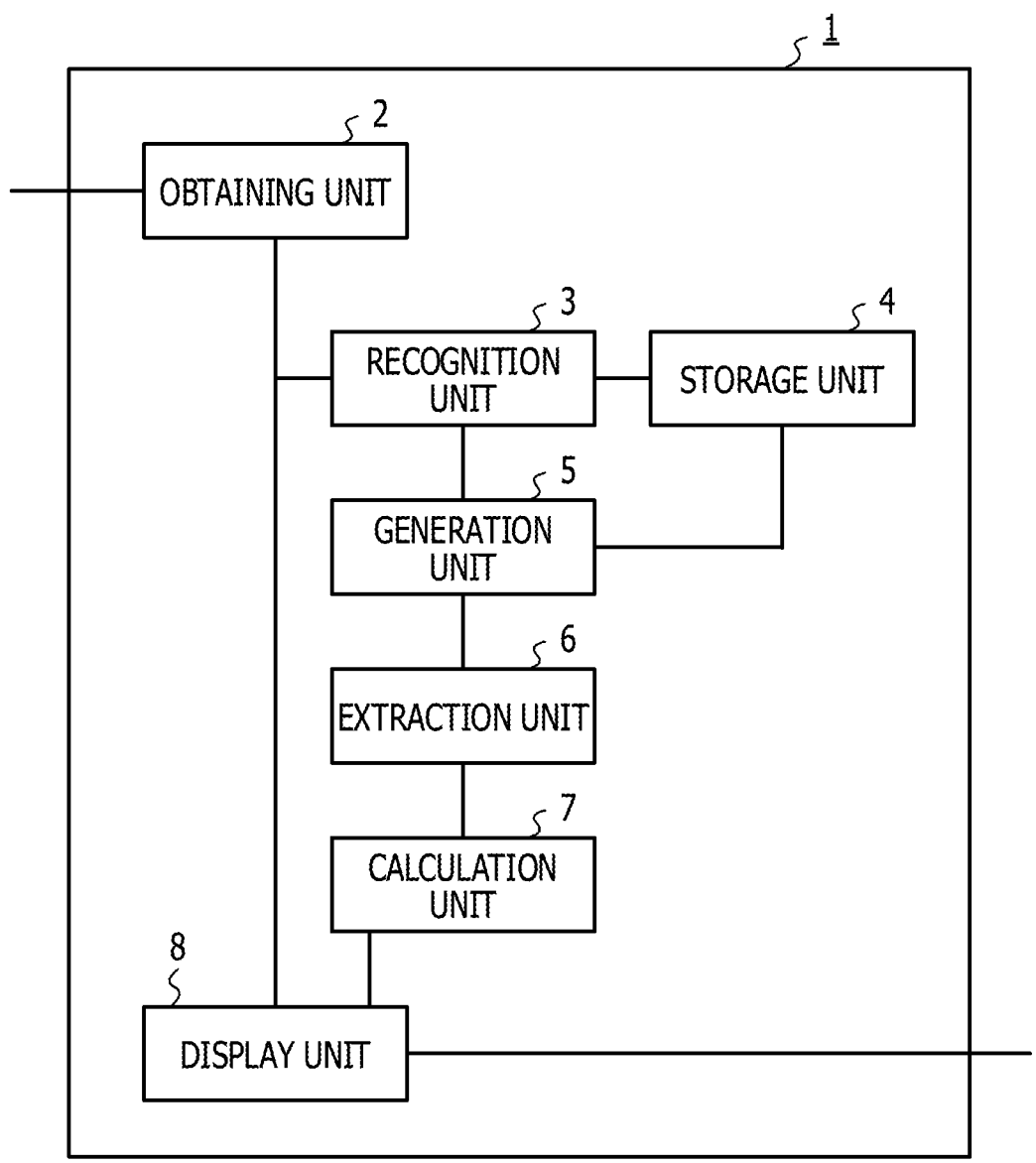
FIG. 3 is a functional block diagram of an image processing apparatus according to a first embodiment.

FIG. 3 is a functional block diagram of an image processing apparatus 1 according to a first embodiment. The image processing apparatus 1 includes an obtaining unit 2, a recognition unit 3, a storage unit 4, a generation unit 5, an extraction unit 6, a calculation unit 7, and a display unit 8. The image processing apparatus 1 is, for example, an integrated circuit such as an application specific integrated circuit (ASIC) or a field programmable gate array (FPGA).

The obtaining unit 2 is, for example, a hardware circuit based on a wired logic. The obtaining unit 2 may be a functional module realized by a computer program executed by the image processing apparatus 1. Furthermore, the obtaining unit 2 includes a communication unit that is not illustrated in the drawing, and it is possible to perform data transmission and reception bi-directionally with various external apparatuses via a communication circuit. The obtaining unit 2 obtains the display information (which may also be referred to as object information) displayed by the display unit 8 that will be described below and an image (which may also be referred to as an input image) including a marker that specifies a reference position for displaying the display information. Herein, the display information is, for example, information including a work content associated with a work target object and the like. The shape of the marker obtained by the obtaining unit 2 may be, for example, the shape of the marker corresponding to the shape illustrated in FIG. 2A. The obtaining unit 2 obtains the image, for example, from the imaging element (which may also be referred to as a camera) corresponding to an example external apparatus which is not illustrated in the drawing. The imaging element is, for example, an imaging device such as a charge coupled device (CCD) or a complementary metal oxide semiconductor (CMOS) camera. The image processing apparatus 1 may include the imaging element as part of components of the image processing apparatus 1. The obtaining unit 2 outputs the obtained image to the recognition unit 3. The obtaining unit 2 also outputs the obtained image to the display unit 8 when appropriate.

The recognition unit 3 is, for example, a hardware circuit based on a wired logic. The recognition unit 3 may be a functional module realized by a computer program executed by the image processing apparatus 1. The recognition unit 3 receives the input image from the obtaining unit 2 and detects a position of the marker in the input image. The recognition unit 3 detects, for example, two-dimensional coordinates of the position of the four-cornered shape of the marker in a two-dimensional coordinate system having an upper left end of the input image set as an origin and coordinate axes in which a horizontal direction is set as an x axis, and a vertical direction is set as a y axis.

The recognition unit 3 recognizes a marker ID corresponding to the marker while the two-dimensional coordinates of the apexes of the four-cornered shape of the marker are set as the reference, for example. In recognition processing of the marker in the recognition unit 3, the marker ID may be recognized by using an arbitrary algorithm, or the marker ID may be recognized by referring to a plurality of markers previously stored as appropriate in the storage unit 4 that will be described below and using template matching. The detection accuracy of the coordinates of the apexes of the four-cornered shape of the marker in the recognition unit 3 may be lower than the detection accuracy used in the calculation for the translation vector or the rotation vector in principle. For this reason, it is possible to recognize the marker ID (for example, the marker ID=13) without being affected by the quantization error or the imaging blur. The recognition unit 3 outputs the recognized marker ID to the generation unit 5. The recognition unit 3 refers, for example, to the storage unit 4 to recognize the display information corresponding to the marker ID and outputs the display information to the display unit 8.

The storage unit 4 is, for example, a semiconductor memory element such as a flash memory or a storage device such as a hard disk drive (HDD) or an optical disc. The storage unit 4 is not limited to the storage device of the above-described types and may be a random access memory (RAM) or read only memory (ROM). The storage unit 4 stores, for example, the marker used by the recognition unit 3 to perform the template matching, the marker ID associated with the marker, the display information corresponding to the marker ID, and the like. The display information includes data of a relative positional relationship with respect to a display surface of the display unit 8 which is displayed based on the reference position. It is accepted that the storage unit 4 is not included in the image processing apparatus 1. For example, the storage unit 4 may be installed in an external apparatus other than the image processing apparatus 1 via a communication circuit by using a communication unit that is not illustrated in the drawings and provided in the image processing apparatus 1. A cache or memory that is not illustrated in the drawings and provided in the respective units of the image processing apparatus 1 as appropriate may store the data stored in the storage unit 4.

The generation unit 5 is, for example, a hardware circuit based on a wired logic. The generation unit 5 may be a functional module realized by a computer program executed by the image processing apparatus 1. The generation unit 5 receives the marker ID from the recognition unit 3. The generation unit 5 generates a marker pattern of the marker corresponding to the marker ID (for example, the marker ID=13). It is sufficient if the marker pattern generated by the generation unit 5 is equivalent, for example, to the shape of the marker illustrated in FIG. 2A. In a case, for example, where the storage unit 4 stores the marker corresponding to the marker ID, the generation unit 5 may obtain the marker from the storage unit 4 and set the obtained marker as the marker pattern. Furthermore, when the marker pattern is generated, for example, the generation unit 5 may generate a marker pattern in which the size of the marker (for example, 1 module=1 pixel) or the gradation (for example, the black area=0 and the white area=255) is normalized. The generation unit 5 outputs the generated marker pattern to the extraction unit 6.

The extraction unit 6 is, for example, a hardware circuit based on a wired logic. The extraction unit 6 may be a functional module realized by a computer program executed by the image processing apparatus 1. The extraction unit 6 receives the marker pattern from the generation unit 5. The extraction unit 6 determines a position of a point having a particular shape feature from the marker pattern as the reference position on the marker pattern. The particular shape feature corresponds, for example, to the four-cornered shape, a checkered shape, or a polygonal shape.

Figure 4A:
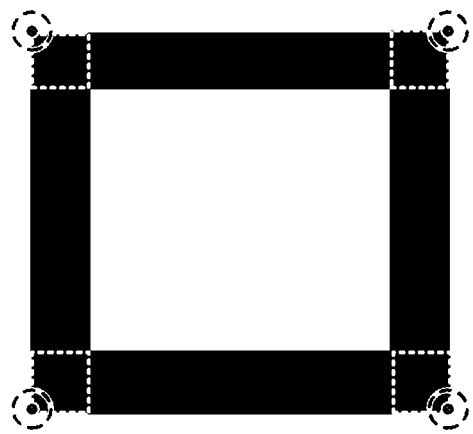
FIG. 4A is a conceptual diagram of the four-cornered shape.
Figure 4B:
FIG. 4B is a conceptual diagram of a checkered shape.
Figure 4C:
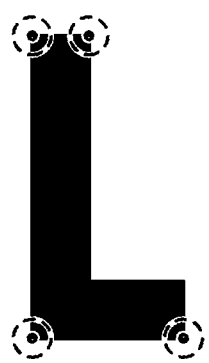
FIG. 4C is a conceptual diagram of a polygonal shape.

FIG. 4A is a conceptual diagram of the four-cornered shape. FIG. 4B is a conceptual diagram of the checkered shape. FIG. 4C is a conceptual diagram of the polygonal shape. In FIG. 4A, FIG. B, and FIG. 4C, for example, the black area may also be referred to as a first pixel area, and the white area may also be referred to as a second pixel area. The first pixel area may be inverted into the white area, and the second pixel area may be inverted into the black areas as appropriate (for example, in accordance with a background color of the object to which the marker is provided). In FIG. 4A, the four-cornered shape corresponds to a shape having four corners on an outer edge of the marker constituted by the first pixel area. Furthermore, a first apex is set in each of the four-cornered shapes as illustrated in FIG. 4A. The first apex is equivalent to one reference position. In FIG. 4B, the checkered shape corresponds to a shape in which a plurality of first pixel areas and a plurality of second pixel areas face each other. A center point of the checkered shape is set as an intersecting point. The intersecting point is equivalent to one reference position. In FIG. 4C, with regard to the polygonal shape, a plurality of first pixel areas are connected to one another by an arbitrary number in an arbitrary shape. The polygonal shape illustrated in FIG. 4C is an example, and the polygonal shape is constituted in various connected shapes. As illustrated in FIG. 4C, a second apex is set in each of the apexes of the polygonal shape. The second apex is equivalent to one reference position. Herein, it may be understood that the second apex is a point where two sides of the polygonal shape are intersected with each other. With regard to line segments of the two sides forming the second apex in the polygonal shape, a shorter line segment may also be referred to as a short side, and a longer line segment may also be referred to as a long side. As described above, in FIG. 4A, FIG. 4B, and FIG. 4C, the first apex, the second apex, and the intersecting point correspond to the reference position. For this reason, the data of the relative positional relationship included in the display information which is stored in the storage unit 4 may include the first apex, the second apex, and the intersecting point.

According to the first embodiment, the marker included in the image obtained by the obtaining unit 2 is, for example, a rectangular marker having a shape obtained by stacking squares having a unit size (module) lengthwise and crosswise as illustrated in FIG. 2A. In the marker, the marker ID is represented by using a difference in combination patterns of the white areas and the black areas of the modules. For this reason, in a case the marker ID stored in the marker varies, the combination pattern of the white areas and the black areas of the modules inside the marker also varies. Herein, with regard to the marker, the two types of shapes including the checkered shape and the polygonal shape described above in addition to the four-cornered shape on the outer circumference are formed inside the marker. It is possible to uniquely determine coordinate positions of the first apex, the second apex, and the intersecting point constituted by the four-cornered shape, the polygonal shape, and the checkered shape when the recognition unit 3 may recognize the marker ID. For this reason, the corresponding reference position may also be detected from the marker included in the image. According to the first embodiment, the first apex, the second apex, and the intersecting point are used as the reference positions for calculating the translation vector or the rotation vector. Accordingly, since the number of the reference coordinates is increased, a calculation error of the translation vector and the rotation vector by the calculation unit 7 which will be described below may be reduced. This reason will be described below.

For example, a least-square method may be employed in the calculation for the translation vector or the rotation vector. When the least-square method is employed, errors in the respective reference positions are represented by expressions, and the translation vector or the rotation vector may be calculated such that and a total sum of these errors becomes the lowest. For example, in a case where the translation vector or the rotation vector is calculated by using N reference positions, the calculation unit 7 calculates the translation vector or the rotation vector such that the error E represented by the following expression becomes the lowest with respect to measured points PCn of the respective reference positions in the coordinate system of the camera reference on the image and with respect to ideal points PM0n of the respective reference positions in the coordinate system of the marker reference.

$$E = \sum_{n=0}^{N} \|PCn - \{R(\theta x, \theta y, \theta z) \cdot PMOn - T\}\| \quad (2)$$

The calculation error of the translation vector and the rotation vector may be reduced by using Expression 2 described above.

The extraction unit 6 determines a coordinate position of the marker included in the input image corresponding to the reference position on the marker pattern. For example, the extraction unit 6 obtains mapping transformation (which may also be referred to as perspective transformation) from a plane coordinate system having a center of the marker pattern set as an origin and coordinate axes of an x axis and a y axis where the origin is set as a base point to a coordinate system of the input image while the coordinates of the apexes of the four-cornered shape of the marker (first apexes) are set as the reference. Subsequently, this mapping transformation is used, and the other reference position is determined while being projected onto the coordinate system of the input image. Accordingly, it is possible to correct a rotation and an inclination of the marker of the input image. With regard to the marker included in the input image, clipping processing may be executed on only a marker portion as appropriate.

The extraction unit 6 extracts the first apex, the second apex, and the intersecting point in the marker of the input image corresponding to the first apex, the second apex, and the intersecting point in the marker pattern. To extract the first apex, the second apex, and the intersecting point in the marker of the input image, the extraction unit 6 compares the respective four-cornered shapes, checkered shapes, and polygonal shapes of the marker pattern and the marker of the input image with each other. Subsequently, the extraction unit 6 identifies the four-cornered shape, the checkered shape, and the polygonal shape of the marker in the corresponding input image. The extraction unit 6 extracts the first apex, the second apex, and the intersecting point corresponding to the reference positions in the input image from the four-cornered shape, the checkered shape, the polygonal shape identified from the marker included in the input image. Hereinafter, descriptions will be given of a detail of an extraction method by the extraction unit 6 for extracting the first apex, the second apex, and the intersecting point corresponding to the reference positions in the input image.

Figure 5A:
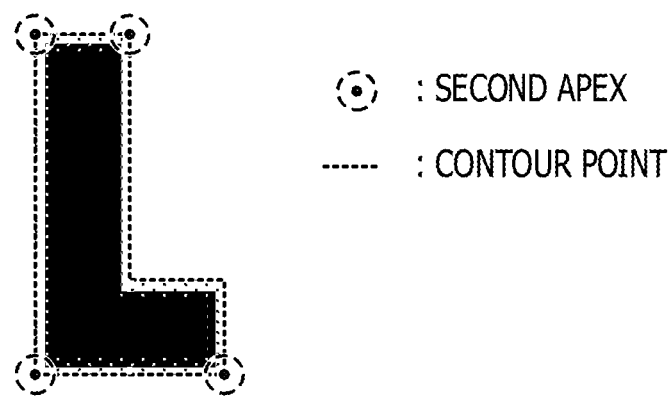
FIG. 5A is a conceptual diagram of the polygonal shape in an input image.
Figure 5B:
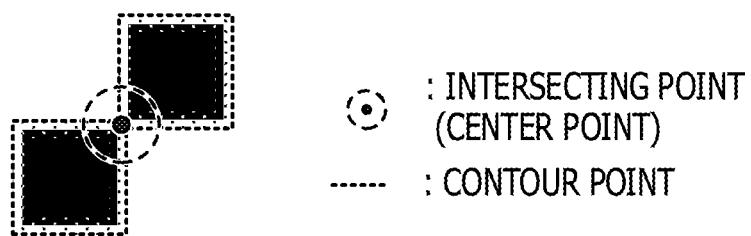
FIG. 5B is a conceptual diagram of the checkered shape in the input image.

The positions of the first apex, the second apex, and the intersecting point may be obtained, for example, as intersecting points of contour straight lines of the outer edges constituting the four-cornered shape, the polygonal shape, and the checkered shape. The contour straight line may be obtained as an approximation straight line that passes through contour points in which a gradation value of the pixel is close to a specific value between the white area and the black area (in general, which is referred to as a binary threshold). This specific value may be previously set or appropriately determined in accordance with a state of the image, but an appropriate value may be changed because of the imaging blur or the quantization error in some cases. Similarly, a correct position of the contour straight line may become indistinct because of the imaging blur or the quantization error in some cases. FIG. 5A is a conceptual diagram of the polygonal shape in the input image. FIG. 5B is a conceptual diagram of the checkered shape in the input image. FIG. 5A and FIG. 5B illustrate a state in which the contour of the outer edge of the polygonal shape or the checkered shape is indistinct while being affected by the quantization error or the imaging blur. In FIG. 5A and FIG. 5B, a case where the above-described specific value is not matched with the appropriate value will be described. First, the contour points in a case where the specific value is set to be higher (brighter) than the appropriate value are indicated by a dotted line. In the case of the polygonal shape illustrated in FIG. 5A, the contour points are detected on an outer side with respect to the position of the contour straight line of the original outer edge. For this reason, the contour straight line specified based on the contour points are also detected on the outer side with respect to the original contour position. As a result, the position of the original second apex specified based on the polygonal shape in the input image is also detected while being shifted towards the outer side. This phenomenon also occurs similarly in the first apex specified based on the four-cornered shape. On the other hand, in the case of the checkered shape illustrated in FIG. 5B, the contour points are detected while being shifted in a point-symmetry direction while the center point of the checkered shape is set as a boundary. Since the imaging blur amounts or the quantization error amounts in proximity regions inside the marker are substantially equal to each other, and shift widths thereof are also substantially equal to each other. For this reason, the contour straight line specified based on the contour points is specified such that the shift amount is cancelled. For this reason, the intersecting point specified based on the checkered shape is detected at the original position. A detail of this technical feature will be described below.

In other words, the intersecting point specified based on the checkered shape is represented as follows. First, for example, the black areas having the checkered pattern are specified as the first pixel areas, and the white areas are specified as the second pixel areas. Furthermore, in the checkered shape, an area where the first pixel area and the second pixel area are connected in the vertical direction to each other is set as a first connected area (for example, an area on a right half of FIG. 4B). A boundary between the first pixel area and the second pixel area in the first connected area is set as a first boundary. Next, a boundary between the first pixel area and the second pixel area respectively point-symmetric with respect to the first connected area (for example, an area on a left half of FIG. 4B) is set as a second boundary. Moreover, a line segment specified based on the first boundary and the second boundary is set as a first line segment. Herein, for example, it is sufficient when the first line segment is in parallel with the first boundary and the second boundary and is also specified based on a midpoint of the first boundary and the second boundary.

Furthermore, in the checkered shape, an area where the first pixel area and the second pixel area are connected in the horizontal direction to each other is set as a second connected area (for example, an area on an upper half of FIG. 4B). A boundary between the first pixel area and the second pixel area in the second connected area is set as a third boundary. Next, a boundary between the first pixel area and the second pixel area respectively point-symmetric with respect to the second connected area (for example, an area on a lower half of FIG. 4B) is set as a fourth boundary. Furthermore, a line segment specified based on the third boundary and the fourth boundary is set as a second line segment. Herein, for example, it is sufficient when the second line segment is in parallel with the third boundary and the fourth boundary and is also specified based on a midpoint of the third boundary and the fourth boundary. In this case, the intersecting point specified based on the checkered shape is similar to the intersecting point of the first line segment and the second line segment.

Figure 6A:
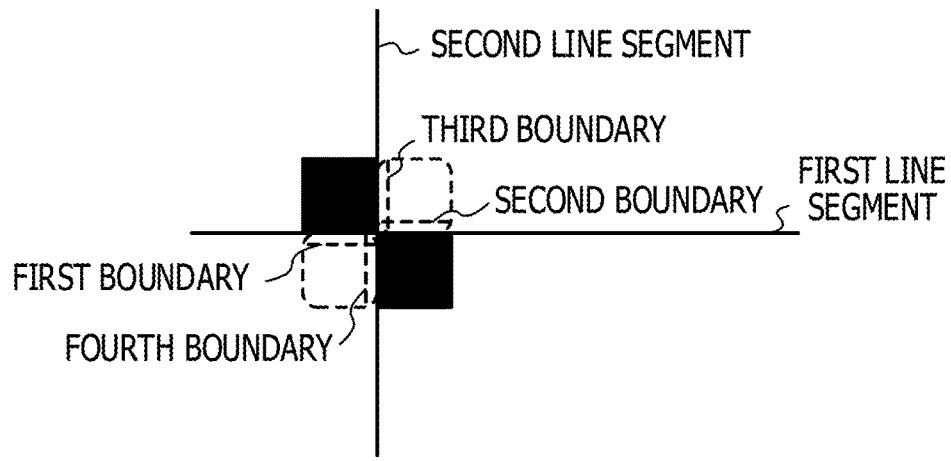
FIG. 6A is a conceptual diagram of a first line segment and a second line segment in the checkered shape.

FIG. 6A is a conceptual diagram of the first line segment and the second line segment in the checkered shape. In the checkered shape illustrated in FIG. 6A, the first boundary and the second boundary are respectively specified on an outer side with respect to the original boundary because of the influences of the quantization error or the imaging blur, for example. However, since the first line segment is in parallel with the first boundary and the second boundary and also is specified based on the midpoint of the first boundary and the second boundary, the influences of the quantization error or the imaging blur of the first boundary and the second boundary are mutually cancelled. This technical feature also similarly appears in the second line segment. Since the intersecting point of the checkered shape is specified by the intersecting point of the first line segment and the second line segment where the influences of the quantization error or the imaging blur are cancelled, it is possible to define the reference position. For this reason, since the display information is displayed at the originally expected position, the visibility of the display information is improved.

According to the first embodiment, a shape other than the checkered shape may be used in the case of the intersecting point specified based on the first boundary in the above-described first connected area, the second boundary between the first pixel area and the second pixel area respectively point-symmetric with respect to the first connected area, and the first line segment and the second line segment corresponding to the line segments specified based on the first boundary and the second boundary.

Figure 6B:
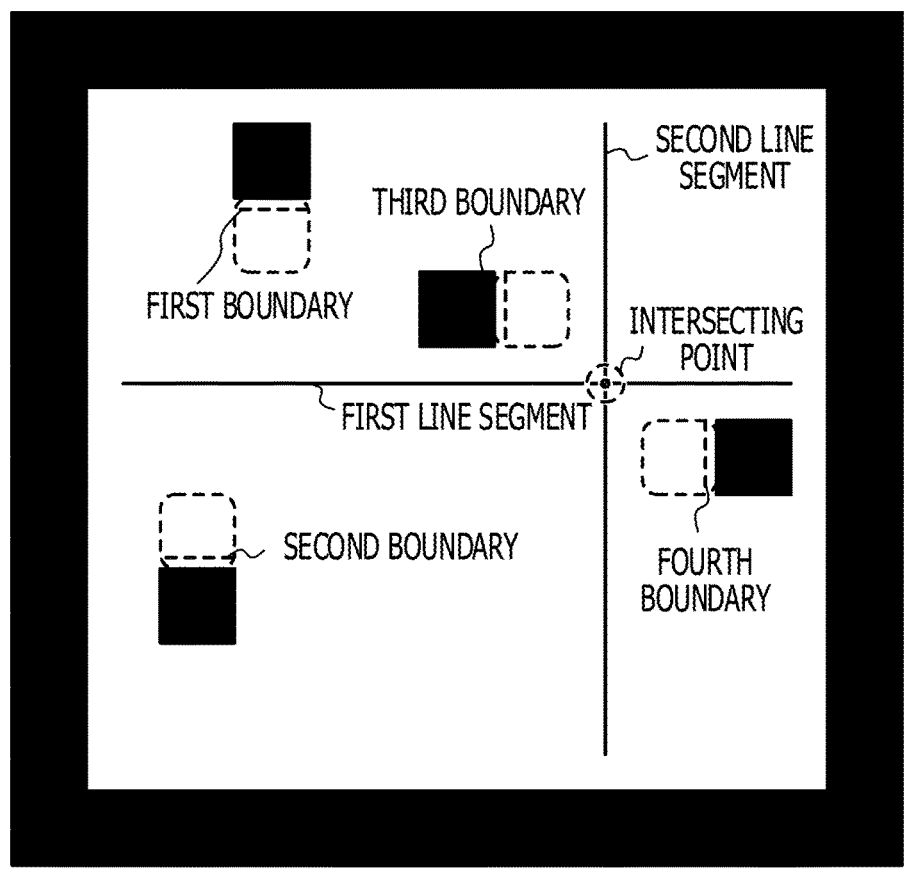
FIG. 6B is a conceptual diagram of the first line segment and the second line segment in other shape.

FIG. 6B is a conceptual diagram of the first line segment and the second line segment in other shape. FIG. 6B illustrates a state in which the first connected area is away from the second connected area. However, as may be understood from FIG. 6B, since the first line segment is in parallel with the first boundary and the second boundary and is also specified based on the midpoint of the first boundary and the second boundary, the influences of the quantization error or the imaging blur of the first boundary and the second boundary are mutually cancelled. This technical feature also similarly appears in the second line segment. Since the intersecting point of the shape is specified by the intersecting point of the first line segment and the second line segment in which the influences of the quantization error or the imaging blur are cancelled, it is possible to define the reference positions. For this reason, since the display information is displayed at the originally expected position, the visibility of the display information is improved. In FIG. 6A, since the first boundary and the second boundary are adjacent to each other while the intersecting point is set as the reference, it is possible to significantly reduce the influence of the imaging blur or the quantization error.

Furthermore, the extraction unit 6 performs the interpolation processing of the sub-pixel accuracy in the input image while the reference position of the input image is set as the base point, so that the detection accuracy of the reference position may be improved. The extraction unit 6 may exclude coordinates where a large shift of the position after the interpolation processing with respect to the reference position occurs at this time while the extraction unit 6 determines that the image quality in the vicinity of the relevant coordinate position is deteriorated and the error is large. An arbitrary range may be previously determined as the error range to be excluded. In a case where a plurality checkered shapes or polygonal shapes exist within the marker, the extraction unit 6 may select the reference position used for the calculation for the translation vector or the rotation vector based on a priority order determined from a reference of each of previously set shape features which will be described below and a reference between the shape features. The extraction unit 6 outputs the selected reference position to the calculation unit 7.

As described above, in a case where a plurality of checkered shapes or polygonal shapes exist inside the marker, the extraction unit 6 may assign priority orders with respect to a plurality of reference positions. In a case where the contour straight line on the outer edge of the checkered shape or the polygonal shape is obtained, as the straight line is longer, pixel information (contour points) that may be used to calculate the contour straight line is further increased, so that the detection accuracy is increased. This is an aspect common to both the cases of the checkered shape and the polygonal shape. For this reason, the extraction unit 6 may use this aspect in the determination of the priority orders among the respective shape features. Specifically, the extraction unit 6 compares lengths of the shortest contour straight lines with each other among the contour straight lines (which may also be referred to as edge sides) that form the checkered shape or the polygonal shape. Subsequently, higher priority orders are assigned to the longer straight lines (which may also be referred to as reference sides). Accordingly, it is possible to reduce the calculation error of the translation vector or the rotation vector. The four-cornered shape may be basically construed as a shape in which a length of a shortest straight line in the polygonal shape (which may also be referred to as a short side) becomes the longest.

Figure 7:
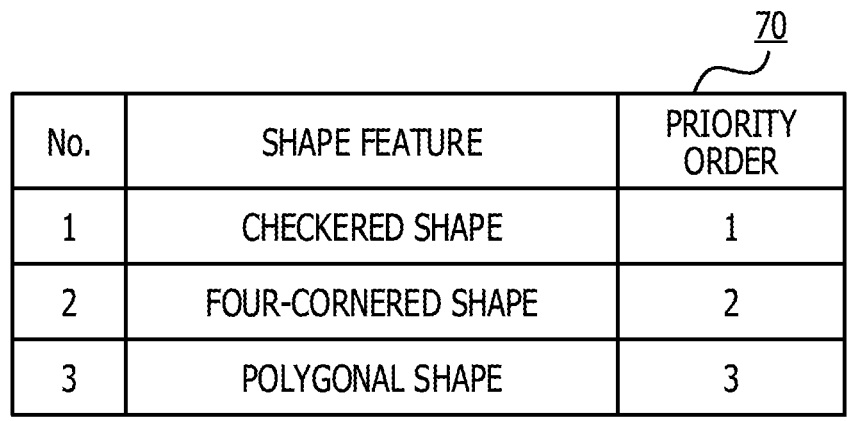
FIG. 7 illustrates an example table including a shape feature and a priority order.

FIG. 7 illustrates an example table including the shape feature and the priority order. As illustrated in a table 70 in FIG. 7, descending priority orders are assigned to the checkered shape, the four-cornered shape, and the polygonal shape in the stated order. The four-cornered shape may be easily affected by other objects and patterns existing in the surrounding of the marker in some cases. For this reason, a case may occur that the error may become larger than the shape inside the marker (polygonal shape). If the above-described case is anticipated, the priority order of the four-cornered shape may be lowered than that of the polygonal shape as appropriate.

The length of the shortest straight line among the straight lines that form the checkered shape or the polygonal shape is a length of one module in principle. A relatively large number of straight lines having this length exist due to the feature of the marker. For this reason, it is also conceivable that it may be difficult to sufficiently assign the priority orders in some cases when only the single checkered shape or polygonal shape is used as the reference. In this case, furthermore, by using a sum of lengths of the straight lines that form the respective shapes of the checkered shapes or the polygonal shapes, and higher priority orders are assigned to the ones with the higher sum in a descending order. Accordingly, it is possible to reduce the calculation error of the translation vector or the rotation vector.

FIG. 8 illustrates an example table including the priority order while using the length of the straight line in the checkered shape. FIG. 9 illustrates an example table including the priority order while using the length of the straight line in the polygonal shape. As illustrated in a table 80 in FIG. 8 and a table 90 in FIG. 9, with regard to the marker exemplified according to the first embodiment, the lengths of the straight lines in the case of the checkered shape include five types corresponding to 1 to 5 modules, and the lengths of the straight lines in the case of the polygonal shape include six types corresponding to 1 to 6 modules. The priority orders are assigned based on these combinations. In the case of the polygonal shape, since at least four straight lines exist, the number of combinations is significantly high. For this reason, in the table 80, a case is exemplified where the lengths of the straight lines are simplified into two types including a length corresponding to one module and a length corresponding to 2 or more modules. In the table 80 and the table 90, higher priority orders are assigned to the longer lengths of the shortest straight line in a descending order. Furthermore, in a case where the lengths of the shortest straight lines are equal to each other, higher priority orders are assigned to the higher sums of the lengths of the straight lines in a descending order.

Herein, descriptions will be given of a technical reason why, for example, a higher priority order is assigned to No. 14 (straight line 1=3, straight line 2=2) than that of No. 6 (straight line 1=1, straight line 2=6) in the table 90 in FIG. 9. The detected positions of the contour points that form the contour straight line are affected by the other polygonal shape or checkered shape located on the contour straight line (it is assumed that this contour straight line extends up to both ends of the marker) in addition to the imaging blur or the quantization error. For this reason, in a case where the other polygonal shape or checkered shape exists nearby, the detection accuracy of the contour straight line itself may also be degraded. For example, a case will be described where the other polygonal shape exists on the contour straight line of the polygonal shape constituted by the contour straight line having the module lengths corresponding to No. 6 (1 module×6 modules) in the table 90 of FIG. 9. In this case, when the contour straight line has only the 1-module length, the contour straight line is affected by the contour point of the other polygonal shape, and the contour points are generally detected as a convex shape, so that a linearly-arranged section hardly remains in some cases. In this case, the accuracy of the contour straight line is decreased. On the other hand, in the case of the contour straight line having the 6-module length, the influences on both ends are equal to those of the contour straight line having the 1-module length. However, the linearly-arranged section having the 2-module length or longer exists between the ends. Thus, it is possible to more accurately determine the contour straight line than the case of the 1-module length because of the effect of this linearly-arranged section. In the case of the contour straight line having the 6-module length, the number of the contour points is high, and a margin is secured when the contour straight line is determined. For this reason, it is also possible to perform the processing of determining the contour straight line while the contour points affected by the other polygonal shape are excluded, for example. Because of the above-described reason, the higher priority order is assigned to the one in which the shortest contour straight line is longer among others.

The calculation unit 7 in FIG. 3 is, for example, a hardware circuit based on a wired logic. The calculation unit 7 may be a functional module realized by a computer program executed by the image processing apparatus 1. The calculation unit 7 receives the reference position from the extraction unit 6. The calculation unit 7 calculates the translation vector and the rotation vector by using, for example, Expression 1 or Expression 2 described above. The calculation unit 7 outputs the calculated translation vector or the rotation vector to the display unit 8. The center position of the marker specified by the four corners of the marker may be set as the reference position as a modified example in the calculation unit 7. In this case, a relative position between the center position and the intersecting point, the first apex, or the second apex may be calculated to calculate the translation vector and the rotation vector based on the relative position. In this case, the intersecting point, the first apex, or the second apex may be referred to as a substantive reference position. Furthermore, when the above-described priority orders based on the detection error are used, and different weighting coefficients are assigned to the respective reference positions, the calculation unit 7 may employ the least-square method. Accordingly, the reference coordinates of the shape feature in which the error is small are preferentially used, and the reduction in the calculation error of the translation vector or the rotation vector may be realized. Specifically, in a case where weightings with respect to the respective reference coordinates are set as Wn, the calculation unit 7 may calculate the translation vector or the rotation vector such that an error E represented by the following expression becomes the lowest.

$$E = \sum_{n=0}^{N} Wn \cdot \{PCn - R(\theta x, \theta y, \theta z) \cdot PMOn - T)\} \qquad (3)$$

By using Expression 3 described above, it is possible to reduce the calculation error of the translation vector and the rotation vector in accordance with the priority order.

FIG. 10 illustrates an example table including the shape feature, the priority order, and the weighting coefficient. In a table 91 in FIG. 10, as the priority order assigned in the table 80 in FIG. 8 and the table 90 in FIG. 9 is higher, the higher weighting coefficient is assigned. The highest weighting coefficient is assigned by priority to the checkered shape that may suppress the error of the reference coordinates best among the respective shape features. The second highest weighting coefficient is assigned to the four-cornered shape. To alleviate the calculation processing, the calculation unit 7 may selectively use the reference coordinates in a descending order of the priority order instead of using all the reference coordinates. The calculation unit 7 uses, for example, 14 reference coordinates to calculate the translation vector or the rotation vector.

The display unit 8 illustrated in FIG. 3 is, for example, a display device such as a liquid crystal display or an organic electroluminescence display. The display unit 8 receives the display information from the recognition unit 3 and receives the translation vector and the rotation vector from the calculation unit 7. The display unit 8 displays the display information based on the translation vector and the rotation vector. The display unit 8 may receives the image from the obtaining unit 2 as appropriate and superpose the display information on the image to be displayed.

Figure 11:
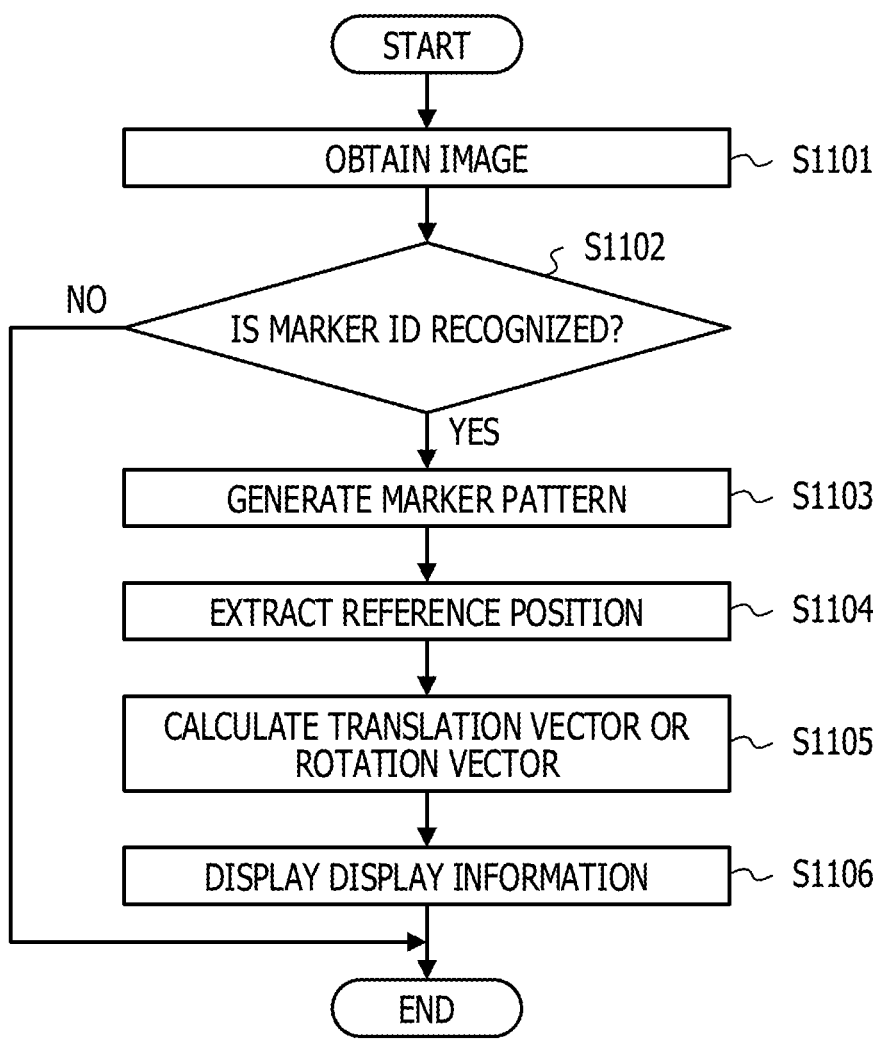
FIG. 11 is a flow chart of image processing by the image processing apparatus.

FIG. 11 is a flow chart of image processing by the image processing apparatus 1. The obtaining unit 2 obtains display information displayed by the display unit 8 and an image (which may also be referred to as an input image) for specifying the reference position for displaying the display information (S1101). The shape of the marker obtained by the obtaining unit 2 may be, for example, the shape of the marker corresponding to the shape illustrated in FIG. 2A. The obtaining unit 2 obtains the image, for example, from the imaging element (which may also be referred to as a camera) corresponding to an example external apparatus which is not illustrated in the drawing. The obtaining unit 2 outputs the obtained image to the recognition unit 3. The obtaining unit 2 outputs the obtained image to the display unit 8 when appropriate.

The recognition unit 3 receives the input image from the obtaining unit 2 and detects a position of the marker in the input image. The recognition unit 3 detects, for example, the two-dimensional coordinates of the position of the four-cornered shape of the marker in the two-dimensional coordinate system having the upper left end of the input image set as the origin and the coordinate axes in which the horizontal direction is set as the x axis, and the vertical direction is set as the y axis. The recognition unit 3 recognizes the marker ID corresponding to the marker while the two-dimensional coordinates of the apexes of the four-cornered shape of the marker are set as the reference, for example (S1102). In a case where the recognition unit 3 does not recognize the marker ID (S1102-No), the image processing apparatus 1 ends the image processing. In a case where the recognition unit 3 may recognize the marker ID (S1102-Yes), the recognized marker ID is output to the generation unit 5. The recognition unit 3 refers, for example, to the storage unit 4 to recognize the display information corresponding to the marker ID and outputs the display information to the display unit 8.

The generation unit 5 receives the marker ID from the recognition unit 3. The generation unit 5 generates a marker pattern of the marker corresponding to the marker ID (for example, the marker ID=13) (S1103). It is sufficient if the marker pattern generated by the generation unit 5 is equivalent, for example, to the shape of the marker illustrated in FIG. 2A. Furthermore, when the marker pattern is generated, for example, the generation unit 5 may generate a marker pattern in which a size of the marker (for example, 1 module=1 pixel) or gradation (for example, the black area=0 and the white area=255) is normalized. The generation unit 5 outputs the generated marker pattern to the extraction unit 6.

The extraction unit 6 extracts the reference position (S1104). Specifically, the extraction unit 6 receives the marker pattern from the generation unit 5. The extraction unit 6 determines a position of a point having a particular shape feature from the marker pattern as the reference position on the marker pattern. The particular shape feature is, for example, the four-cornered shape, the checkered shape, or the polygonal shape. The extraction unit 6 determines a coordinate position of the marker included in the input image corresponding to the reference position on the marker pattern. For example, the extraction unit 6 sets the center of the marker pattern as the origin. Subsequently, the mapping transformation (which may also be referred to as perspective transformation) from the plane coordinate system having the coordinate axes of the x axis and the y axis where the origin is set as the base point to the coordinate system of the input image is obtained while the coordinates of the apexes of the four-cornered shape of the marker (first apexes) are set as the reference. When this mapping transformation is used, the other reference position may be determined while being projected onto the coordinate system of the input image. Accordingly, it is possible to correct the rotation and the inclination of the marker of the input image. With regard to the marker included in the input image, the clipping processing may be executed on only the marker portion as appropriate.

The extraction unit 6 extracts the first apex, the second apex, and the intersecting point in the marker of the input image corresponding to the first apex, the second apex, and the intersecting point in the marker pattern. To extract the first apex, the second apex, and the intersecting point in the marker of the input image, the extraction unit 6 compares the respective four-cornered shapes, checkered shapes, and polygonal shapes of the marker pattern and the marker of the input image with each other. Subsequently, the extraction unit 6 identifies the four-cornered shape, the checkered shape, and the polygonal shape of the marker in the corresponding input image. The extraction unit 6 extracts the first apex, the second apex, and the intersecting point corresponding to the reference positions in the input image from the four-cornered shape, the checkered shape, the polygonal shape identified from the marker included in the input image. The extraction unit 6 outputs the extracted reference positions to the calculation unit 7.

In S1104, the extraction unit 6 performs the interpolation processing of the sub-pixel accuracy in the input image while the reference position of the input image is set as the base point, so that the detection accuracy of the reference position may be improved. The extraction unit 6 may exclude coordinates where a large shift of the position after the interpolation processing with respect to the reference position occurs at this time while the extraction unit 6 determines that the image quality in the vicinity of the relevant coordinate position is deteriorated and the error is large. An arbitrary range may be previously determined as the error range to be excluded.

Furthermore, in S1104, in a case where a plurality checkered shapes or polygonal shapes exist within the marker, the extraction unit 6 may select the reference position used for the calculation for the translation vector or the rotation vector based on a priority order determined from a reference of each of previously set shape features which will be described below and a reference between the shape features. In this case, the extraction unit 6 outputs the selected reference position to the calculation unit 7.

The calculation unit 7 receives the reference position from the extraction unit 6. The calculation unit 7 uses, for example, Expression 1, Expression 2, or Expression 3 described above to calculate the translation vector or the rotation vector (S1105). The calculation unit 7 outputs the calculated translation vector or the rotation vector to the display unit 8.

The display unit 8 receives the display information from the recognition unit 3 and receives the translation vector and the rotation vector from the calculation unit 7. The display unit 8 displays the display information based on the translation vector and the rotation vector (S1106). The display unit 8 may receives the image from the obtaining unit 2 as appropriate and superpose the display information on the image to be displayed.

In S1101, for example, the obtaining unit 2 continuously obtains the image, the image processing apparatus 1 repeatedly executes the processings in S1101 to S1106. In S1101, in a case where the obtaining unit 2 does not obtain an image, the image processing illustrated in the flow chart of FIG. 11 is ended.

The image processing apparatus 1 according to the first embodiment may improve the visibility to the user of the display information. For example, in a case where the marker ID is successfully taken out from the marker, a state in which a geometric shape of the marker is already identified is used. Other than the four-cornered shape of the marker, a plurality of positions which have already identified coordinate positions within the marker and which may also be detected are selected, and at least one of the plurality of positions is used for the calculation for the translation vector and the rotation vector as the reference coordinates. Accordingly, the calculation error of the translation vector and the rotation vector may be reduced. Accordingly, since the display information is displayed at the originally expected position, the visibility of the display information is improved. Furthermore, it is possible to reduce the calculation error of the translation vector and the rotation vector by the interpolation of the sub-pixel accuracy and the assignment of the priority order or the weighting coefficient to the shape feature with which the error is reduced because of the geometric feature.

Second Embodiment

Figure 12:
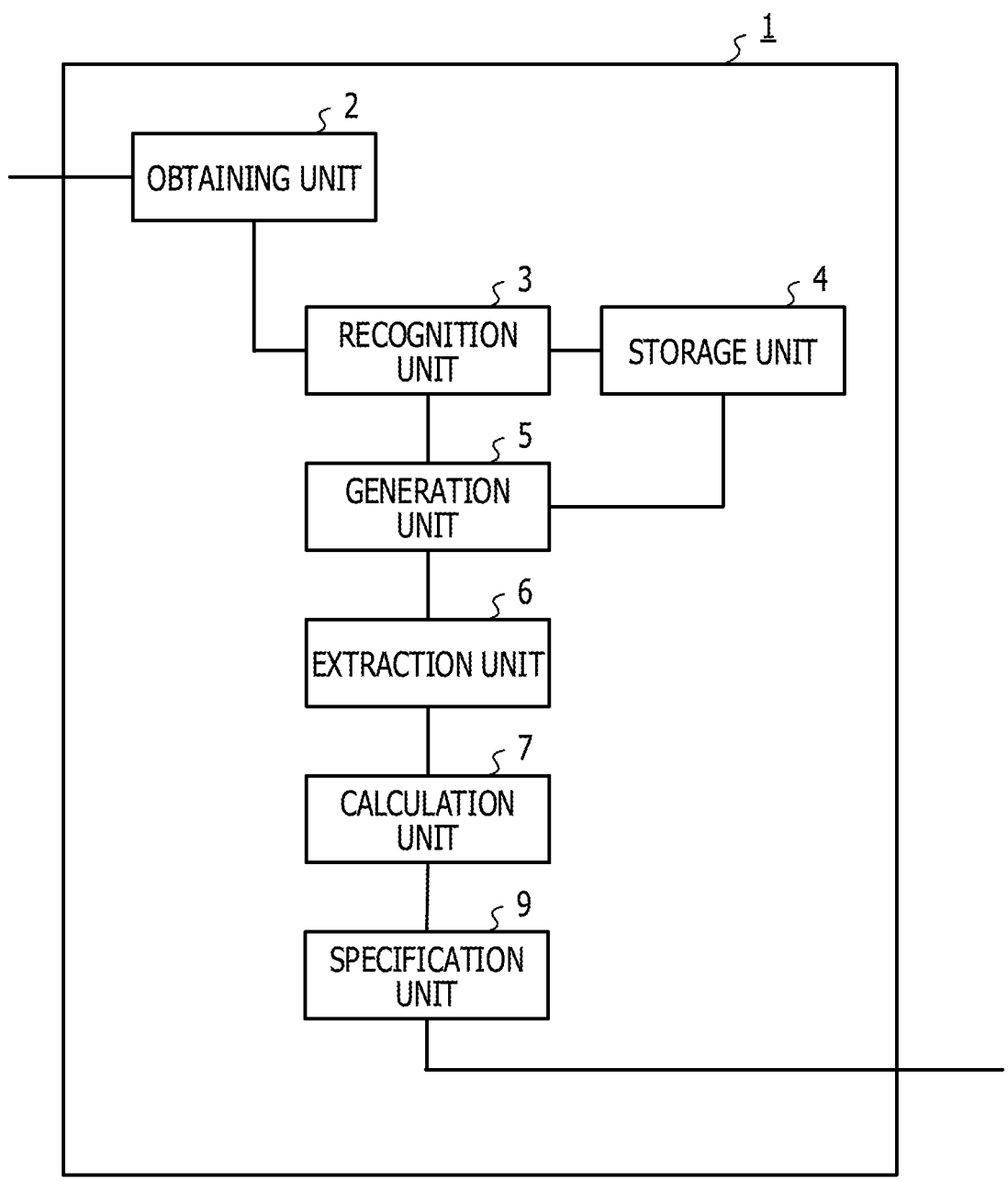
FIG. 12 is a functional block diagram of the image processing apparatus according to a second embodiment.

FIG. 12 is a functional block diagram of the image processing apparatus 1 according to a second embodiment. The image processing apparatus 1 includes the obtaining unit 2, the recognition unit 3, the storage unit 4, the generation unit 5, the extraction unit 6, the calculation unit 7, and a specification unit 9. The image processing apparatus 1 is constituted, for example, by an integrated circuit such as an application specific integrated circuit (ASIC) or a field programmable gate array (FPGA). The functions of the respective function units of the image processing apparatus 1 except for the specification unit 9 according to the second embodiment are similar to those of the first embodiment, and detailed descriptions will be omitted.

The specification unit 9 is, for example, a hardware circuit based on a wired logic. The specification unit 9 may be a functional module realized by a computer program executed by the image processing apparatus 1. The specification unit 9 receives the number of the intersecting points, the first apexes, or the second apexes used to calculate the display position from the calculation unit 7. The specification unit 9 specifies the reliability of the translation vector or the rotation vector for displaying the display information based on the number of the intersecting points, the first apexes, or the second apexes used to calculate the display position.

FIG. 13A illustrates an example of a first marker in which the first apexes, the second apexes, and the intersections are indicated. FIG. 13B illustrates an example of a second marker in which the first apexes, the second apexes, and the intersections are indicated. As illustrated in FIG. 13A and FIG. 13B, since the numbers of the first apexes, the second apexes, and the intersections vary depending on a pattern of the marker, the calculation accuracy of the translation vector and the rotation vector depends on a marker ID. For this reason, while the reliability indicating the calculation accuracy of the translation vector and the rotation vector is calculated, it is possible to perform the operation such as allocation of the marker having the high calculation accuracy of the translation vector and the rotation vector to the important display information. FIG. 13C illustrates an example table including reliability. The reliability illustrated in a table 93 in FIG. 13C may be calculated by an arbitrary method. The reliability is specified, for example, based on the number of the shape features used to calculate the translation vector or the rotation vector and the number of the shape features having the high priority order. In the table 93 in FIG. 13C, a numeric value corresponding to a total of values obtained by multiplying the numbers of the respective shape features by previously determined reliability coefficients is exemplified as the reliability. In the two markers illustrated in FIG. 13A and FIG. 13B, since the numbers of the four-cornered shapes are the same as the numbers of the polygonal shapes, a difference in the numbers of the checkered shapes is represented as a difference in the reliability.

The image processing apparatus 1 according to the second embodiment may specify the reliability of the translation vector and the rotation vector (in other words, the reliability of the marker) in accordance with the marker ID, for example. Accordingly, it is possible to allocate the marker having the high calculation accuracy of the translation vector and the rotation vector to the display information important to the user.

Third Embodiment

Figure 14:
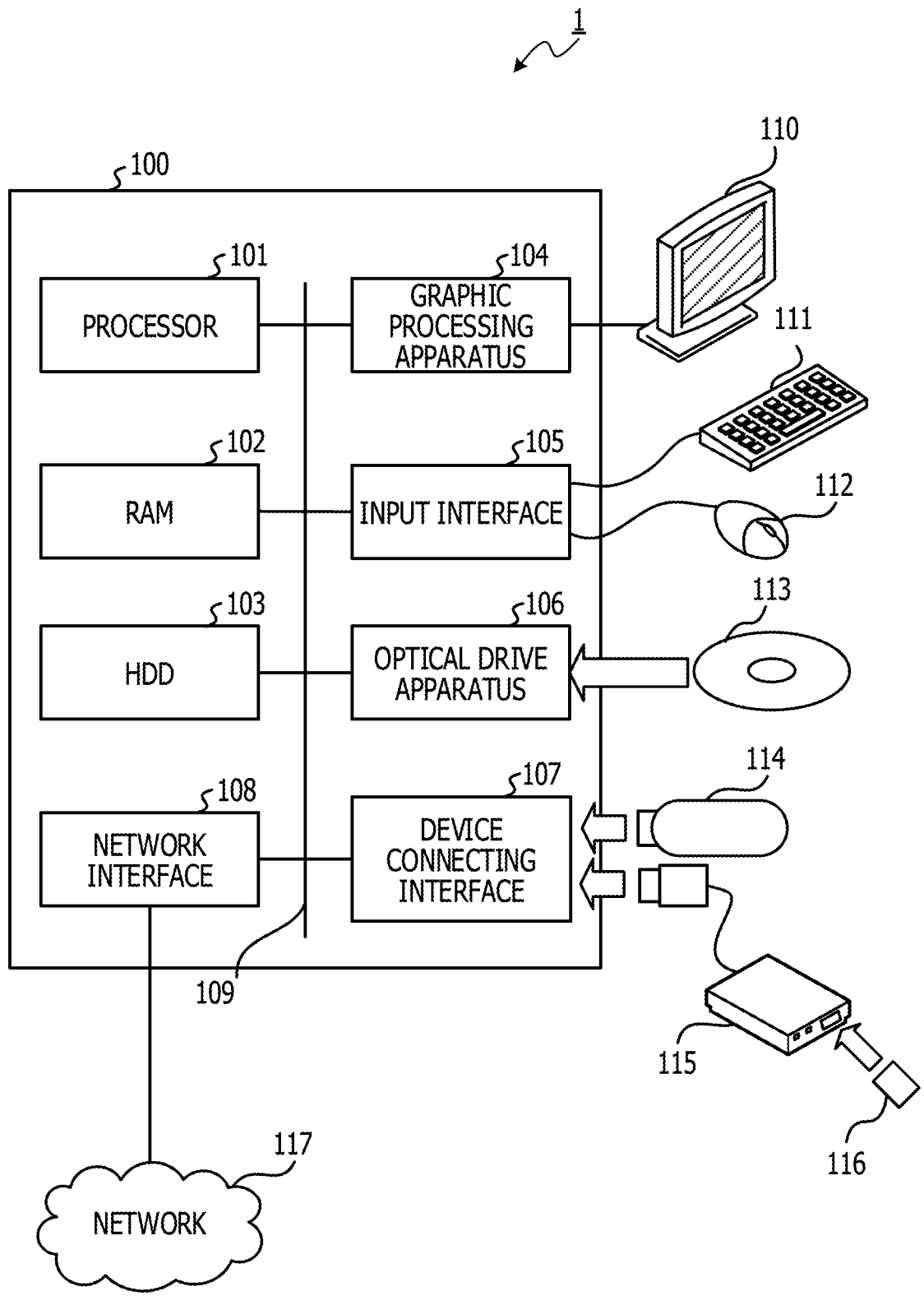
FIG. 14 is a hardware configuration diagram of a computer functioning as an image processing apparatus according to an embodiment.

FIG. 14 is a hardware configuration of a computer functioning as the image processing apparatus 1 according to an embodiment. As illustrated in FIG. 14, the image processing apparatus 1 includes a computer 100 and input and output apparatuses (peripheral devices) connected to the computer 100.

In the computer 100, an entire apparatus is controlled by a processor 101. A random access memory (RAM) 102 and a plurality of peripheral devices are connected to the processor 101 via a bus 109. The processor 101 may be a multi-processor. The processor 101 is, for example, a CPU, a micro processing unit (MPU), a digital signal processor (DSP), an application specific integrated circuit (ASIC), or a programmable logic device (PLD). Furthermore, the processor 101 may be constituted by a combination including two or more elements of the CPU, the MPU, the DSP, the ASIC, and the PLD.

The RAM 102 is used as a main storage device of the computer 100. The RAM 102 temporarily stores at least part of a program of an operating system (OS) and an application program executed by the processor 101. The RAM 102 stores various pieces of data used for processing by the processor 101.

The peripheral devices connected to the bus 109 include a hard disk drive (HDD) 103, a graphic processing apparatus 104, an input interface 105, an optical drive apparatus 106, a device connecting interface 107, and a network interface 108.

The HDD 103 magnetically writes and reads data with respect to a built-in disc. The HDD 103 is used, for example, as an auxiliary storage device of the computer 100. The HDD 103 stores the program of the OS, the application program, and various pieces of data. A semiconductor storage device such as a flash memory may also be used as the auxiliary storage device.

A monitor 110 is connected to the graphic processing apparatus 104. The graphic processing apparatus 104 displays various images on a screen of the monitor 110 in accordance with commends from the processor 101. The monitor 110 includes a display device using a cathode ray tube (CRT), a liquid crystal display device, or the like.

A key board 111 and a mouse 112 are connected to the input interface 105. The input interface 105 transmits signals transmitted from the key board 111 and the mouse 112 to the processor 101. The mouse 112 is an example pointing device, and other pointing devices may also be used. The other pointing devices include a touch panel, a tablet, a touch pad, a track ball, and the like.

The optical drive apparatus 106 reads data recorded on the optical disc 113 by using laser light or the like. The optical disc 113 is a portable recording medium on which the data is recorded such that the data may be read by light reflection. The optical disc 113 includes Digital Versatile Disc (DVD), DVD-RAM, a compact disc read only memory (CD-ROM), CD-Recordable (R)/Rewritable (RW), or the like. The program stored in the optical disc 113 corresponding to a portable recording medium is installed to the image processing apparatus 1 via the optical drive apparatus 106. A predetermined installed program may be executed by the image processing apparatus 1.

The device connecting interface 107 is a communication interface for connecting the peripheral devices to the computer 100. For example, a memory device 114 and a memory reader writer 115 may be connected to the device connecting interface 107. The memory device 114 is a recording medium provided with a communication function with the device connecting interface 107. The memory reader writer 115 is an apparatus that writes data to a memory card 116 or reads data from the memory card 116. The memory card 116 includes a card-type recording medium.

The network interface 108 is connected to a network 117. The network interface 108 transmits and receives data with other computer or communication device via the network 117.

When the computer 100 executes programs recorded in a computer-readable recording medium, for example, the above-described image processing function is realized. The programs in which processing contents executed by the computer 100 are described may be recorded in various recording media. The above-described programs may be constituted by one or a plurality of functional modules. For example, the programs may be constituted by the functional modules that realize the obtaining unit 2, the recognition unit 3, the generation unit 5, the extraction unit 6, the calculation unit 7, and the like described in FIG. 3. The programs executed by the computer 100 may be stored in the HDD 103. The processor 101 loads at least part of the programs in the HDD 103 onto the RAM 102 to execute the programs. The programs executed by the computer 100 may also be recorded in a portable recording medium such as the optical disc 113, the memory device 114, or the memory card 116. The programs stored in the portable recording medium are installed into the HDD 103 to be executable under the control from the processor 101, for example. The processor 101 may directly read out the programs from the portable recording medium to be executed.

The respective components of the respective illustrated apparatuses may adopt configurations physically different from the illustrated configurations. That is, specific modes of distribution and integration of the respective apparatuses are not limited to the illustrated modes, and all or part of the apparatuses may be configured by functionally or physically distributing or integrating the apparatuses in an arbitrary unit in accordance with various loads, use states, and the like. The various processings described according to the above-described embodiments may be realized while previously prepared programs are executed by a computer such as a personal computer or a work station.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An image processing apparatus, comprising:
a memory; and
a processor coupled to the memory and configured to:
obtain an image of a marker that includes a first pixel area and a second pixel area having mutually different color tones and is used to identify display information and a reference position for displaying the display information, the first pixel area including a first image indicating a shape of an outer frame of the first pixel area and a second image arranged within the outer frame, extract, from the image of the marker, an intersecting point of a first line segment in parallel with a boundary between the first pixel area and the second pixel area which are adjacent to each other along a predetermined direction and a second line segment in parallel with a boundary between the first pixel area and the second pixel area which are adjacent to each other along a direction perpendicular to the predetermined direction, a first apex indicating an apex of four corners of the outer frame, and a second apex included in the second image, and identify a position for displaying the display information while the intersecting point, the first apex, or the second apex is set as the reference position, wherein the first line segment is identified by a first boundary obtained by being adjacent to the first pixel area and the second pixel area in a stated order towards the predetermined direction and a second boundary obtained by being adjacent to the second pixel area and the first pixel area in a stated order towards the predetermined direction, and the second line segment is identified by a third boundary obtained by being adjacent to the first pixel area and the second pixel area in a stated order towards the direction perpendicular to the predetermined direction and a fourth boundary obtained by being adjacent to the second pixel area and the first pixel area in a stated order towards the direction perpendicular to the predetermined direction.

2. The image processing apparatus according to claim 1, wherein the first line segment is in parallel with the first boundary and the second boundary and is identified based on a midpoint of the first boundary and the second boundary, and the second line segment is in parallel with the third boundary and the fourth boundary and is identified based on a midpoint of the third boundary and the fourth boundary.

3. The image processing apparatus according to claim 1, wherein the second image includes an image of a polygonal shape, and the second apex includes an apex of the polygonal shape.

4. The image processing apparatus according to claim 1, wherein the processor is configured to identify the reference position based on descending priorities set with respect to the intersecting point, the first apex, and the second apex in a stated order.

5. The image processing apparatus according to claim 4, wherein the priorities include weighting coefficients, and the processor is configured to apply the weighting coefficients to the intersecting point, the first apexes, and the second apexes to calculate the reference position.

6. The image processing apparatus according to claim 4, wherein the processor is configured to:

extract a long side formed by a plurality of second apexes included in the image of the polygonal shape and a short side shorter than the long side, and set the priorities with respect to the plurality of second apexes based on a length of the short side.

7. The image processing apparatus according to claim 6, wherein the processor is configured to:

set the priorities with respect to the plurality of second apexes in a manner that a higher priority is assigned as a length of the long side is longer in a case where two or more of the short sides having the same length are extracted.

8. The image processing apparatus according to claim 1, wherein the second image includes an image of one or more checkered shapes formed by part of the first pixel area and part of the second pixel area, and the processor is configured to extract a center point of the one or more of the checkered shapes as the intersecting point.

9. The image processing apparatus according to claim 8, wherein the processor is configured to:

extract edge sides of each of the one or more of the checkered shape, and set the priorities with respect to the plurality of intersecting points extracted from the one or more checkered shapes in a manner that a higher priority is assigned as a length of the edge side is longer.

10. The image processing apparatus according to claim 1, wherein the processor is configured to:

extract a marker ID from the marker, generate a marker pattern corresponding to the marker ID, and extract the intersecting point, the first apex, and the second apex by using the marker pattern.

11. An image processing method executed by a processor included in an image processing apparatus, the method comprising:

obtaining an image of a marker that includes a first pixel area and a second pixel area having mutually different color tones and is used to identify display information and a reference position for displaying the display information, the first pixel area including a first image indicating a shape of an outer frame of the first pixel area and a second image arranged within the outer frame;

extracting, from the image of the marker, an intersecting point of a first line segment in parallel with a boundary between the first pixel area and the second pixel area which are adjacent to each other along a predetermined direction and a second line segment in parallel with a boundary between the first pixel area and the second pixel area which are adjacent to each other along a direction perpendicular to the predetermined direction, a first apex indicating an apex of four corners of the outer frame, and a second apex included in the second image; and identifying a position for displaying the display information while the intersecting point, the first apex, or the second apex is set as the reference position, wherein the first line segment is identified by a first boundary obtained by being adjacent to the first pixel area and the second pixel area in a stated order towards the predetermined direction and a second boundary obtained by being adjacent to the second pixel area and the first pixel area in a stated order towards the predetermined direction, and the second line segment is identified by a third boundary obtained by being adjacent to the first pixel area and the second pixel area in a stated order towards the direction perpendicular to the predetermined direction and a fourth boundary obtained by being adjacent to the second pixel area and the first pixel area in a stated order towards the direction perpendicular to the predetermined direction.

12. The image processing method according to claim 11, wherein the first line segment is in parallel with the first boundary and the second boundary and is identified based on a midpoint of the first boundary and the second boundary, and the second line segment is in parallel with the third boundary and the fourth boundary and is identified based on a midpoint of the third boundary and the fourth boundary.

13. The image processing method according to claim 11, wherein the second image includes an image of a polygonal shape, and the second apex includes an apex of the polygonal shape.

14. The image processing method according to claim 11, wherein the method further comprising:

identifying the reference position based on descending priorities set with respect to the intersecting point, the first apex, and the second apex in a stated order.

15. The image processing method according to claim 14, wherein the priorities include weighting coefficients, and the method further comprising:

applying the weighting coefficients to the intersecting point, the first apexes, and the second apexes to calculate the reference position.

16. A non-transitory computer-readable storage medium storing a program that causes a processor included in a computer to execute a process, the process comprising:

obtaining an image of a marker that includes a first pixel area and a second pixel area having mutually different color tones and is used to identify display information and a reference position for displaying the display information, the first pixel area including a first image indicating a shape of an outer frame of the first pixel area and a second image arranged within the outer frame;

extracting, from the image of the marker, an intersecting point of a first line segment in parallel with a boundary between the first pixel area and the second pixel area which are adjacent to each other along a predetermined direction and a second line segment in parallel with a boundary between the first pixel area and the second pixel area which are adjacent to each other along a direction perpendicular to the predetermined direction, a first apex indicating an apex of four corners of the outer frame, and a second apex included in the second image; and identifying a position for displaying the display information while the intersecting point, the first apex, or the second apex is set as the reference position, wherein the first line segment is identified by a first boundary obtained by being adjacent to the first pixel area and the second pixel area in a stated order towards the predetermined direction and a second boundary obtained by being adjacent to the second pixel area and the first pixel area in a stated order towards the predetermined direction, and the second line segment is identified by a third boundary obtained by being adjacent to the first pixel area and the second pixel area in a stated order towards the direction perpendicular to the predetermined direction and a fourth boundary obtained by being adjacent to the second pixel area and the first pixel area in a stated order towards the direction perpendicular to the predetermined direction.

17. The storage medium according to claim 16, wherein the first line segment is in parallel with the first boundary and the second boundary and is identified based on a midpoint of the first boundary and the second boundary, and the second line segment is in parallel with the third boundary and the fourth boundary and is identified based on a midpoint of the third boundary and the fourth boundary.

18. The storage medium according to claim 16, wherein the second image includes an image of a polygonal shape, and the second apex includes an apex of the polygonal shape.

19. The storage medium according to claim 16, wherein the process further comprising:

identify the reference position based on descending priorities set with respect to the intersecting point, the first apex, and the second apex in a stated order.

20. The storage medium according to claim 19, wherein the priorities include weighting coefficients, and the process further comprising:

applying the weighting coefficients to the intersecting point, the first apexes, and the second apexes to calculate the reference position.

* * * * *